United States Patent [19]

Endo

[11] Patent Number: 5,889,493
[45] Date of Patent: Mar. 30, 1999

[54] PORTABLE GPS POSITION MEASURING/DISPLAYING APPARATUS

[75] Inventor: Hiroshi Endo, Hachioji, Japan

[73] Assignee: Harada Industry Co., Ltd., Tokyo, Japan

[21] Appl. No.: 754,285

[22] Filed: Nov. 20, 1996

[30] Foreign Application Priority Data

Nov. 21, 1995 [JP] Japan .................................. 7-302964

[51] Int. Cl.⁶ .............................. G01S 5/02; H04B 7/185
[52] U.S. Cl. .......................... 342/357; 701/213; 340/995
[58] Field of Search .................... 342/352, 357; 701/213; 455/12.1; 340/995

[56] References Cited

U.S. PATENT DOCUMENTS

| 5,515,057 | 5/1996 | Lennen et al. | 342/357 |
| 5,627,548 | 5/1997 | Woo et al. | 342/357 |
| 5,685,431 | 11/1997 | Rudow et al. | 364/449.7 |

FOREIGN PATENT DOCUMENTS

| 61137007 | 6/1986 | Japan . | |
| 247577 | 2/1990 | Japan . | |

*Primary Examiner*—Thomas Tarcza
*Assistant Examiner*—Dero L. Phan
*Attorney, Agent, or Firm*—John P. White; Cooper & Dunham LLP

[57] ABSTRACT

A portable GPS position measuring/displaying apparatus has a portable case, a liquid crystal display provided for the portable case, operation keys of a variety of kinds which are provided on the case, a map storage card detachably inserted in the portable case, and a multi-layered printed circuit board inserted in the portable case. The printed circuit board includes a patch type GPS antenna for receiving GPS waves from an artificial satellite, a GPS receiver made of an LSI which processes information represented by the received GPS waves so as to produce position data of an object to be measured, an operation device for calculating the position where the object to be measured is present on the basis of the position data, and display means for displaying the calculated position of the object on the screen of the liquid crystal display such that the calculated position is superimposed on map data read from the map storage card.

10 Claims, 11 Drawing Sheets

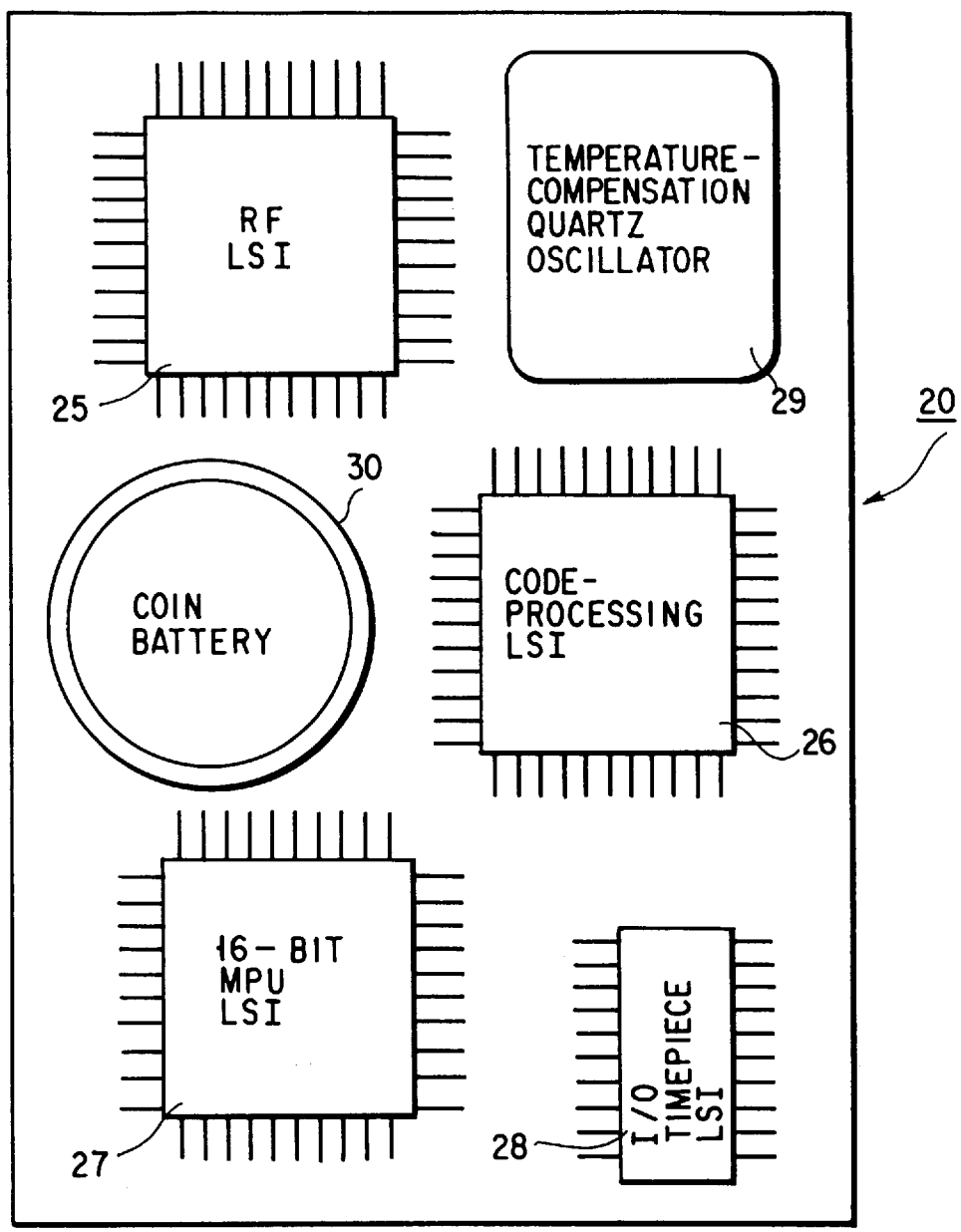
F I G. 4

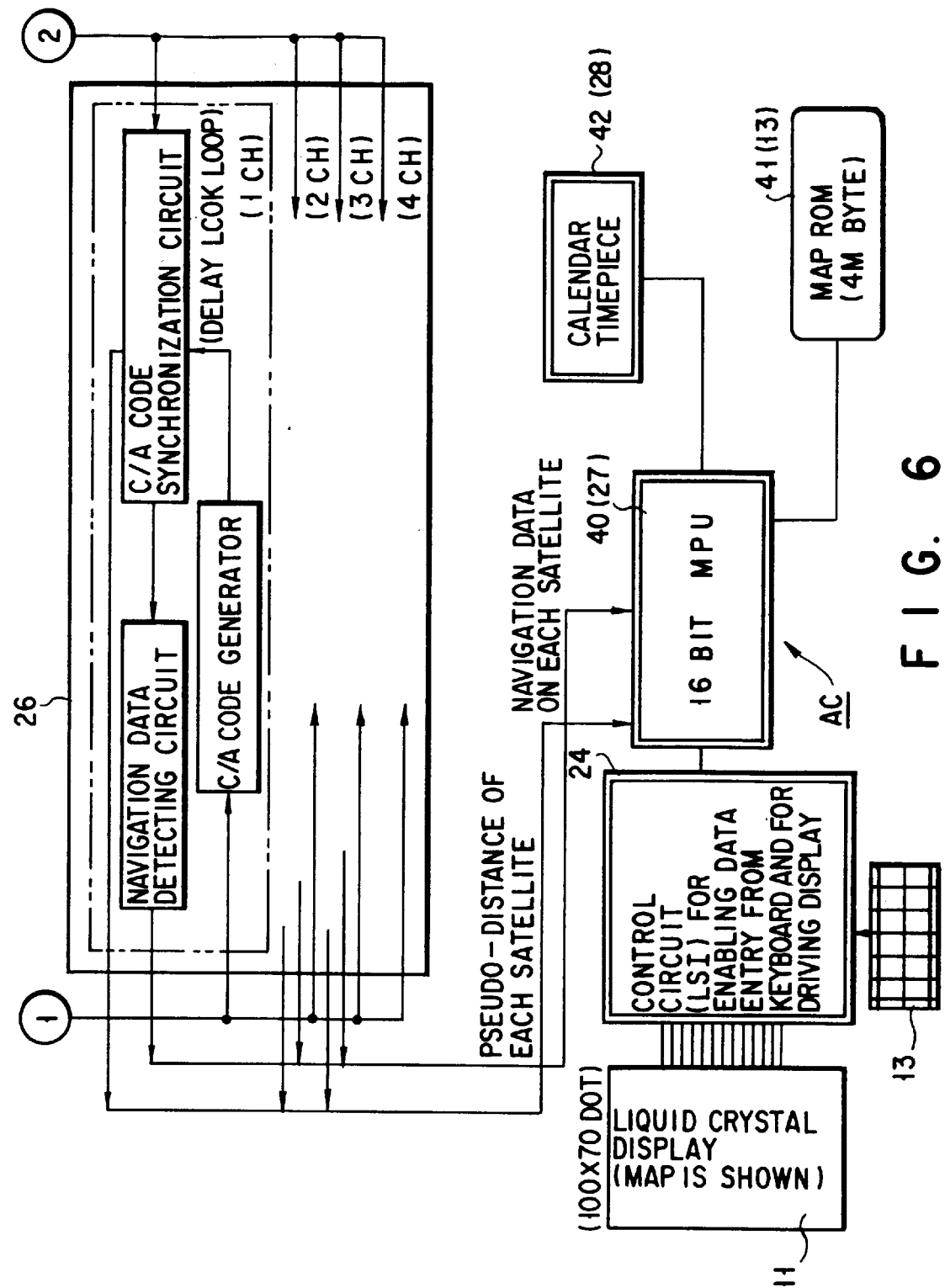
F I G. 6

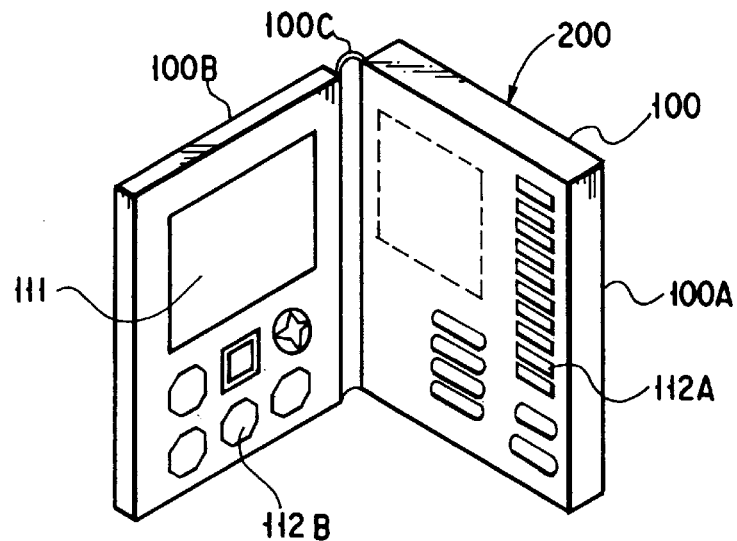
F I G. 11
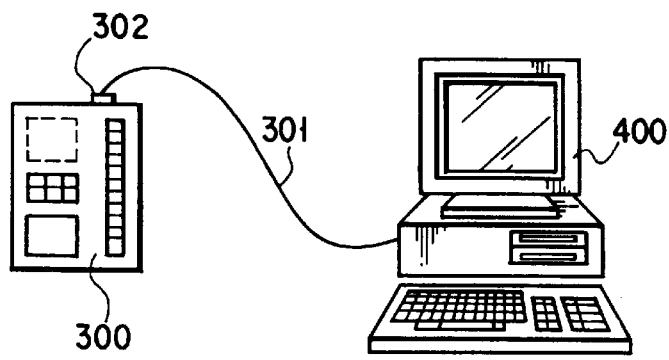
F I G. 12
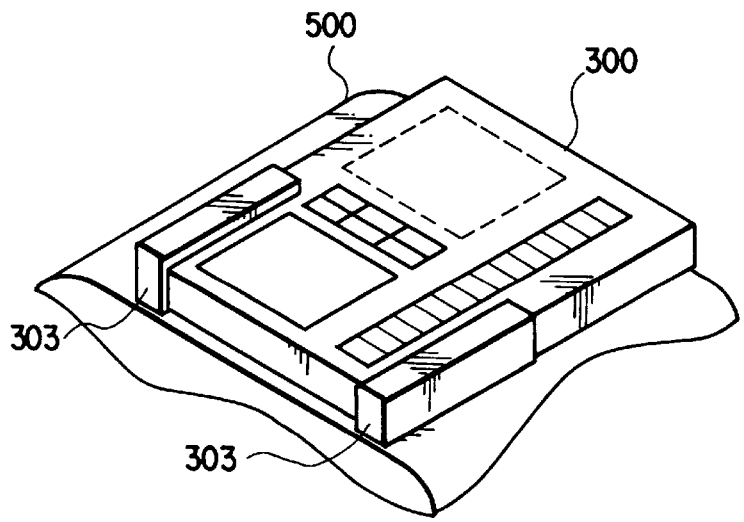
F I G. 13

PORTABLE GPS POSITION MEASURING/DISPLAYING APPARATUS

BACKGROUND OF THE INVENTION

1. Field of the Invention

The present invention relates to a portable GPS position measuring/displaying apparatus which can be put in a pocket and easily carried at all times. More specifically, the present invention relates to a portable GPS position measuring/displaying apparatus which is suitable for use in leisure activities (such as hiking, orienterring, travel, mounting climbing, and cycling), business, and events for women and children, and which enables the user to easily confirm the present position or destination and is therefore useful in preventing lost children in emergency.

2. Description of the Related Art

FIG. 1 is a perspective view showing a portable GPS position measuring/displaying apparatus for automobiles, which is conventionally known as a car navigation system.

Referring to FIG. 1, reference numeral 1 denotes a car computer unit. A GPS receiver, a display processor, a CD-ROM player, an internal/external signal processing unit, etc. are arranged inside the car computer unit. A GPS antenna 2 and a liquid crystal display 3 are connected to the car computer unit 1 by means of cables 5a and 5b. A key operation commander 4 sends instructions or commands to the car computer unit 1 and/or the liquid crystal display 3 by radio.

A conventional portable GPS position measuring/displaying apparatus for automobile is made up of a number of independent structural components (the apparatus mentioned above is made up of four independent components), and each of these components is comparative large in size. Therefore, the conventional portable GPS position measuring/displaying apparatus is not appropriate for use as a portable type. In addition, the conventional portable GPS position measuring/displaying apparatus consumes a comparatively large amount of power and must employ a battery of high capacitance. In light of this point as well, the conventional apparatus is not suitable for use as a portable type. It should be also noted that the conventional apparatus is expensive as a whole.

Accordingly, an object of the present invention is to provide:

(a) a portable GPS position measuring/displaying apparatus which is small in size and light in weight and which is suitable for use as a portable apparatus;

(b) a portable GPS position measuring/displaying apparatus which can be manufactured at a very low cost, which is at least one half of the cost needed for manufacturing a conventional apparatus; and (c) a portable GPS position measuring/displaying apparatus which enables accurate correction of the time of a timepiece used for calculating the present position from navigation data, and which enables the user to know the correct standard time whenever necessary.

SUMMARY OF THE INVENTION

The above object is attained by providing a portable GPS position measuring/displaying apparatus which comprises:

a portable case;

a liquid crystal display provided for the portable case;

operation keys of a variety of kinds which are provided on the case;

a map storage card detachably inserted in the portable case; and a multi-layered printed circuit board inserted in the portable case, the printed circuit board including: a patch type GPS antenna for receiving GPS waves from an artificial satellite; a GPS receiver made of an LSI which processes information represented by the received GPS waves so as to produce position data of an object to be measured; an operation device for calculating the position where the object to be measured is present on the basis of the position data; and display means for displaying the calculated position of the object on the screen of the liquid crystal display such that the calculated position is superimposed on map data read from the map storage card.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 4 is a plan view showing the reverse side of the multi-layered printed circuit board employed in the portable GPS position measuring/displaying apparatus of the first embodiment;

FIG. 6 is a block diagram showing the remaining part of the basic circuit of the apparatus of the first embodiment;

FIG. 11 is a perspective view showing a portable GPS position measuring/displaying apparatus according to the second embodiment of the present invention;

FIG. 12 shows a system wherein an apparatus according to the present invention is connected to a personal computer; and FIG. 13 shows how an apparatus of the present invention is provided for a moving object in a detachable manner.

DETAILED DESCRIPTION OF THE PREFERRED EMBODIMENTS (First Embodiment)

Figure 1:
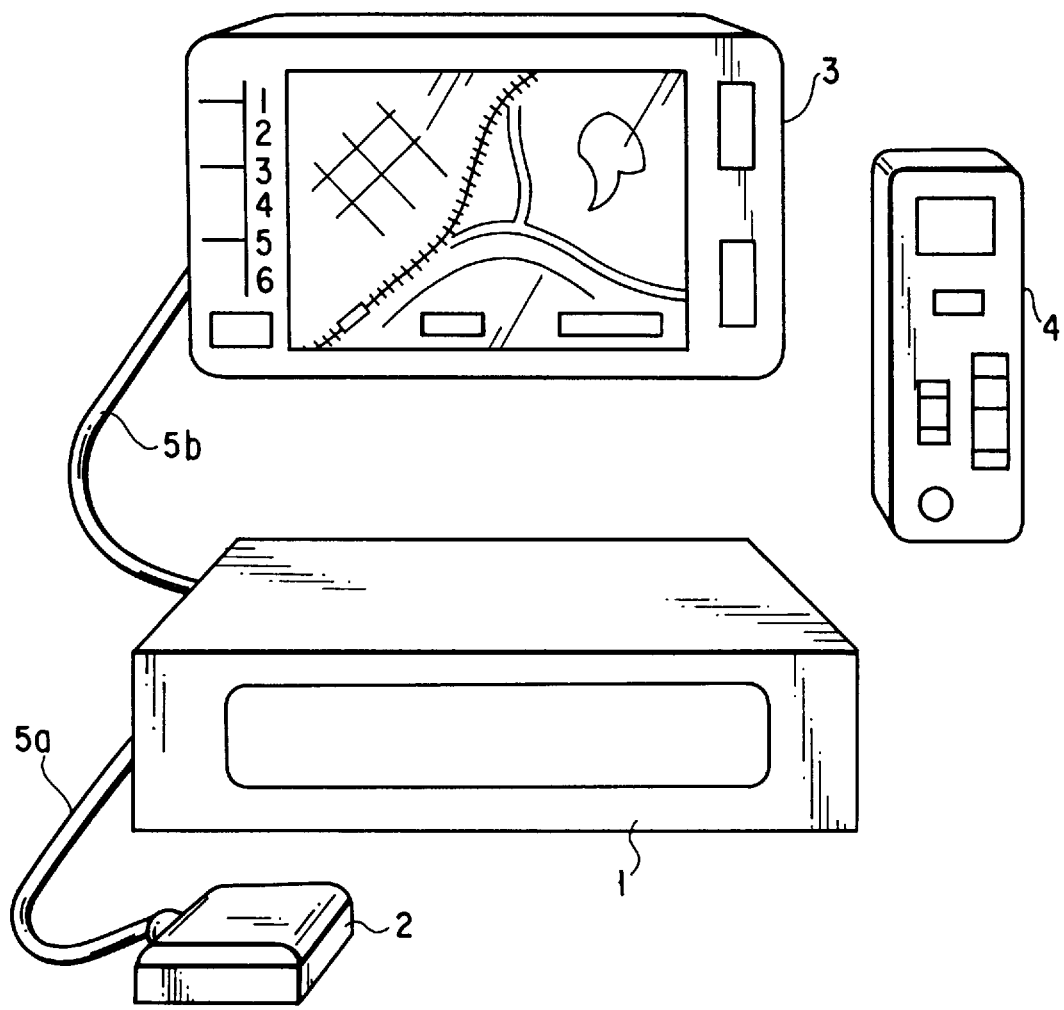
FIG. 1 is a respective view showing a conventional portable GPS position measuring/displaying apparatus for automobiles.
Figure 2:
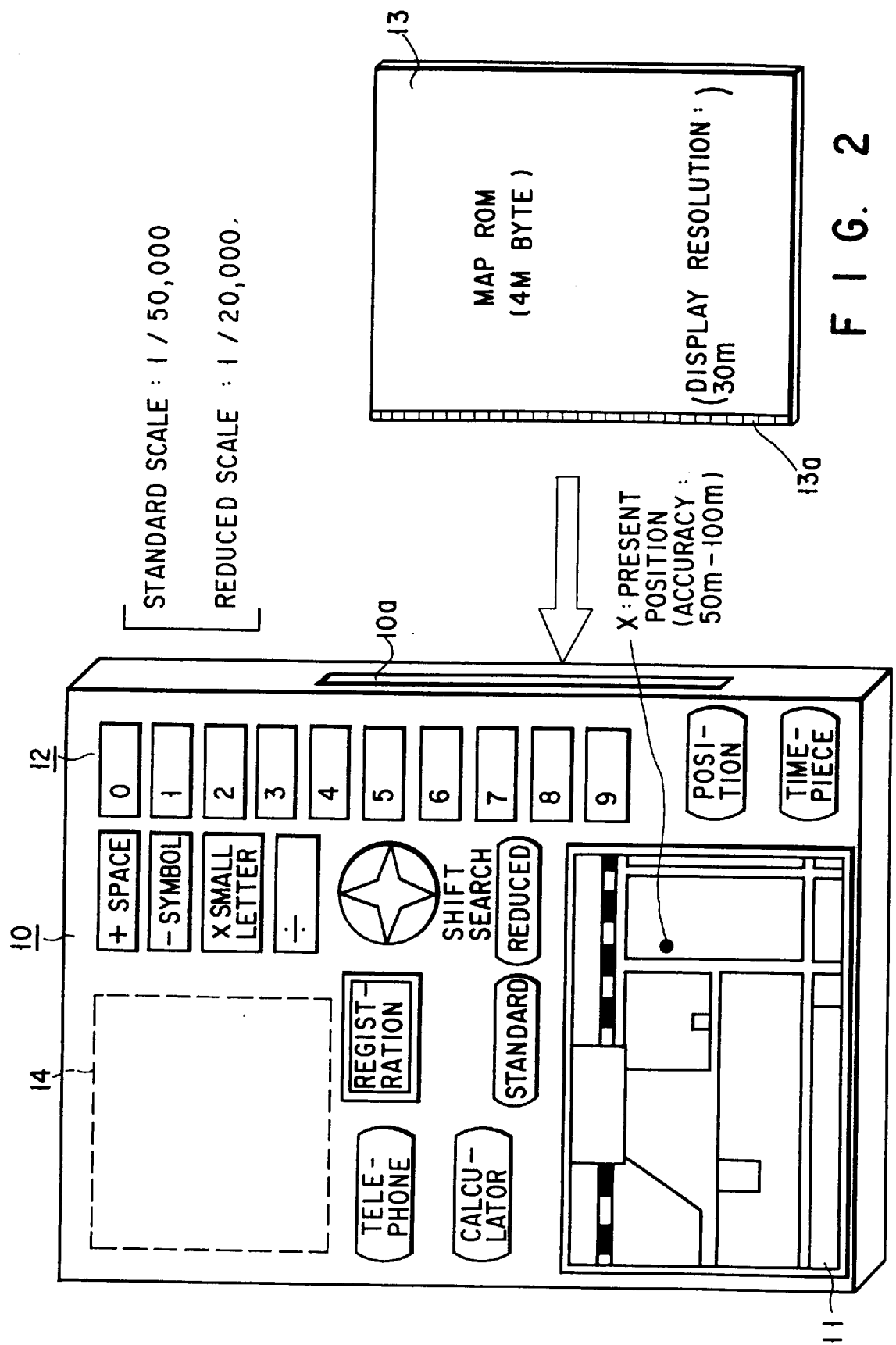
FIG. 2 is a perspective view showing a portable GPS position measuring/displaying apparatus for automobiles, which is according to the first embodiment of the present invention.

FIG. 2 is a perspective view showing a portable GPS position measuring/displaying apparatus according to the first embodiment of the present invention. As shown in FIG. 2, the portable GPS position measuring/displaying apparatus is made mainly of a single card-type case 10 which is 90 mm in length, 70 mm in width, and not more than 10 mm or so in thickness. In short, the apparatus is like a pocket-sized book. A small-sized liquid crystal display 11 capable of displaying data in color and a variety of operation keys 12 (function keys, numeral keys and arithmetical operation keys) are provided on the outer wall of the card-type case 10. The function keys include a position measurement key, a timepiece key, a calculator key, a phone book key, a calculation-registration key, a shift search key, a map display magnification key (standard scale: 1/50,000, reduced scale: 1/200,000), etc. The numeral keys serve not only as the "ten-key" pad of the calculator but also as keys for entering codes, such as a destination code.

The card-type case 10 has a card insertion port 10a at one side. Through this port 10a, an arbitrary map storage card 13 is inserted into the case 10, as indicated by the arrow shown in FIG. 2. Although not shown, the map storage card 13 has a read-only memory having a storage capacity of about (4M bytes×8 bits/byte). (The read-only memory will be referred to simply as a ROM in the description of the first embodiment given below.) The ROM stores various map data, such as regional groups of maps drawn to the scale of 1/50,000 (mesh: resolution; about 30 m) and data representing an arrangement of indoor objects. The map storage card 13 has a multi-pole connector pin member 13a formed of conductive rubber, sponge, or the like. The connector pin member 13a has about 30 pins and located at that side from which the map storage card 13 is inserted into the case 10.

A multi-layered printed circuit board (not shown in FIG. 2), such as a 5-layered printed circuit board, is located within the interior of the case 10. As will be described later, the multi-layered printed circuit board includes the following: a patch type GPS antenna 14 provided on the circuit board in such a manner as to receive GPS waves from an artificial satellite; a GPS receiver (not shown in FIG: 2) made of an LSI which processes information represented by the GPS waves received by the GPS antenna 14 so as to produce position data of an object to be measured (i.e. a person or object that carries the receiver); an operation device (not shown in FIG. 2) made of an LSI which calculates the position where the object to be measured is present on the basis of the position data produced by the GPS receiver; and display means (not shown in FIG. 2) for displaying the position of the object calculated by the operation device on the screen of the liquid crystal display 11 such that the calculated position is superimposed on map data read from the map storage card 13. These structural components are arranged on the printed circuit board with high density.

Figure 3:
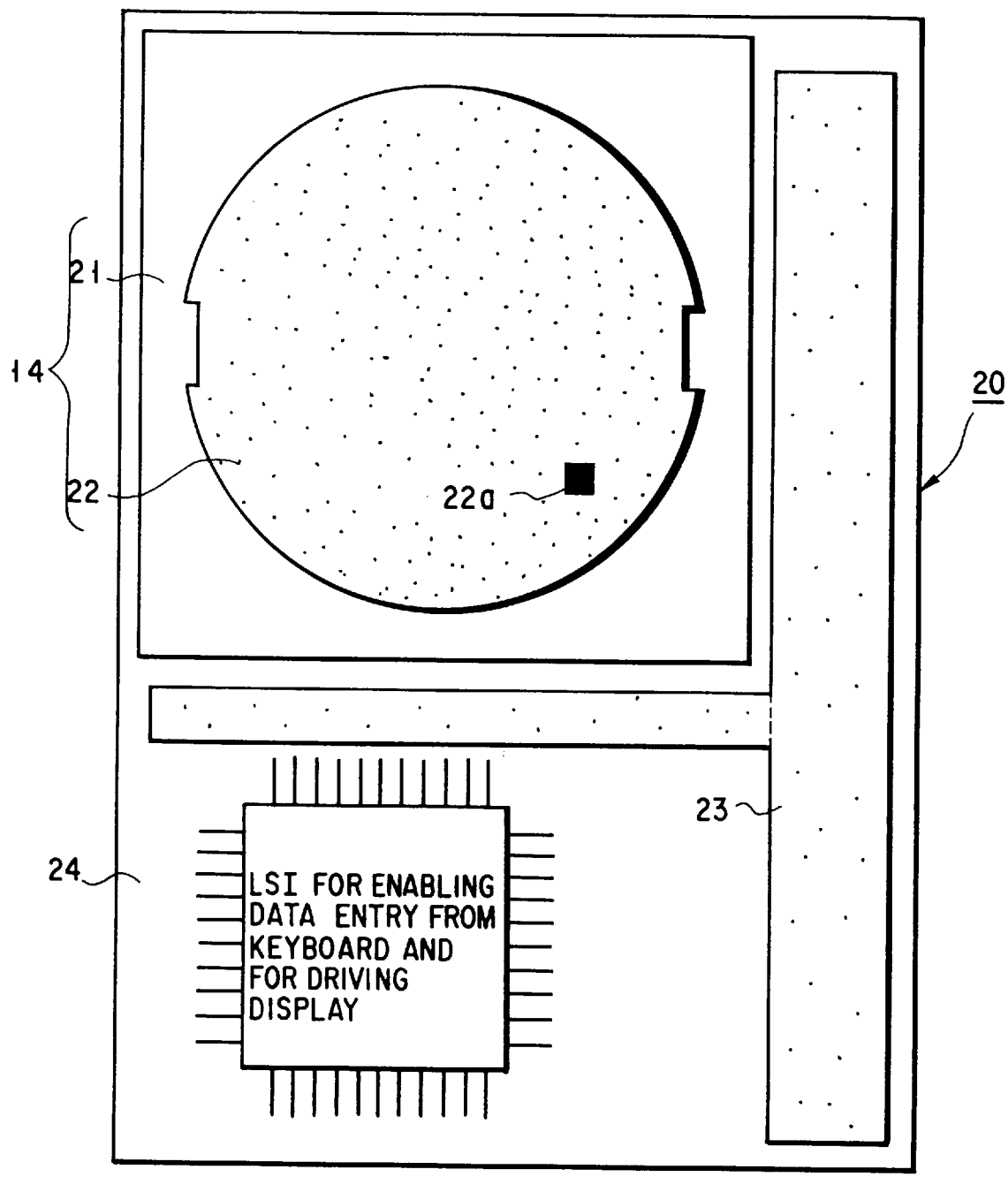
FIG. 3 is a plan view showing the obverse side of a multi-layered printed circuit board employed in the portable GPS position measuring/displaying apparatus of the first embodiment.

FIG. 3 is a plan view showing the obverse side of the multi-layered printed circuit board 20 arranged inside the card-type case 10, while FIG. 4 is a plan view showing the reverse side of the same multi-layered printed circuit board 20. The multi-layered printed circuit board 20 is, for example, a board having so-called inner via holes, and wiring layers provided at different levels are electrically connected together through these holes. In comparison with the through-hole type board conventionally known in the art, the board having the inner via holes enables a very high-density arrangement of elements, and is hardly affected by noise.

As shown in FIG. 3, a metal foil pattern 22 is provided for the obverse side of the multi-layered printed circuit board 20. The metal foil pattern 22 is substantially circular and has a diameter in the range of 35φ to 45φ, and is formed directly on a dielectric substrate 21 having a large dielectric constant (the dielectric substrate 21 is an alumina substrate, for example). (The reverse side of the circuit board 20 is completely covered with a metal foil, and serves as a so-called grounded surface.) The metal foil pattern 22 and the dielectric substrate 21 jointly constitute a circularly-polarized printed antenna (which corresponds to the GPS antenna 14 shown in FIG. 2). In FIG. 3, reference symbol 22a denotes a point at which power is applied to the antenna, reference numeral 23 denotes a conductive film for keyboard, and reference numeral 24 denotes an LSI for enabling data entry from the keyboard and for driving the display.

As shown in FIG. 4, the following structural elements are arranged on the reverse side of the multi-layered printed circuit board 20: an RF LSI 25 constituting the major portion of the GPS receiver; a code processing LSI 26 which executes code processing; an MPU LSI 27 for-detecting a satellite orbit and an object position by calculation and for performing geodetic system conversion; an LSI 28 for calendar timepiece; a temperature-compensation quartz oscillator 29; a battery 30 which is made of a coin battery and employs a secondary battery, such as a dry battery or a NiCd battery; etc.

Figure 5:
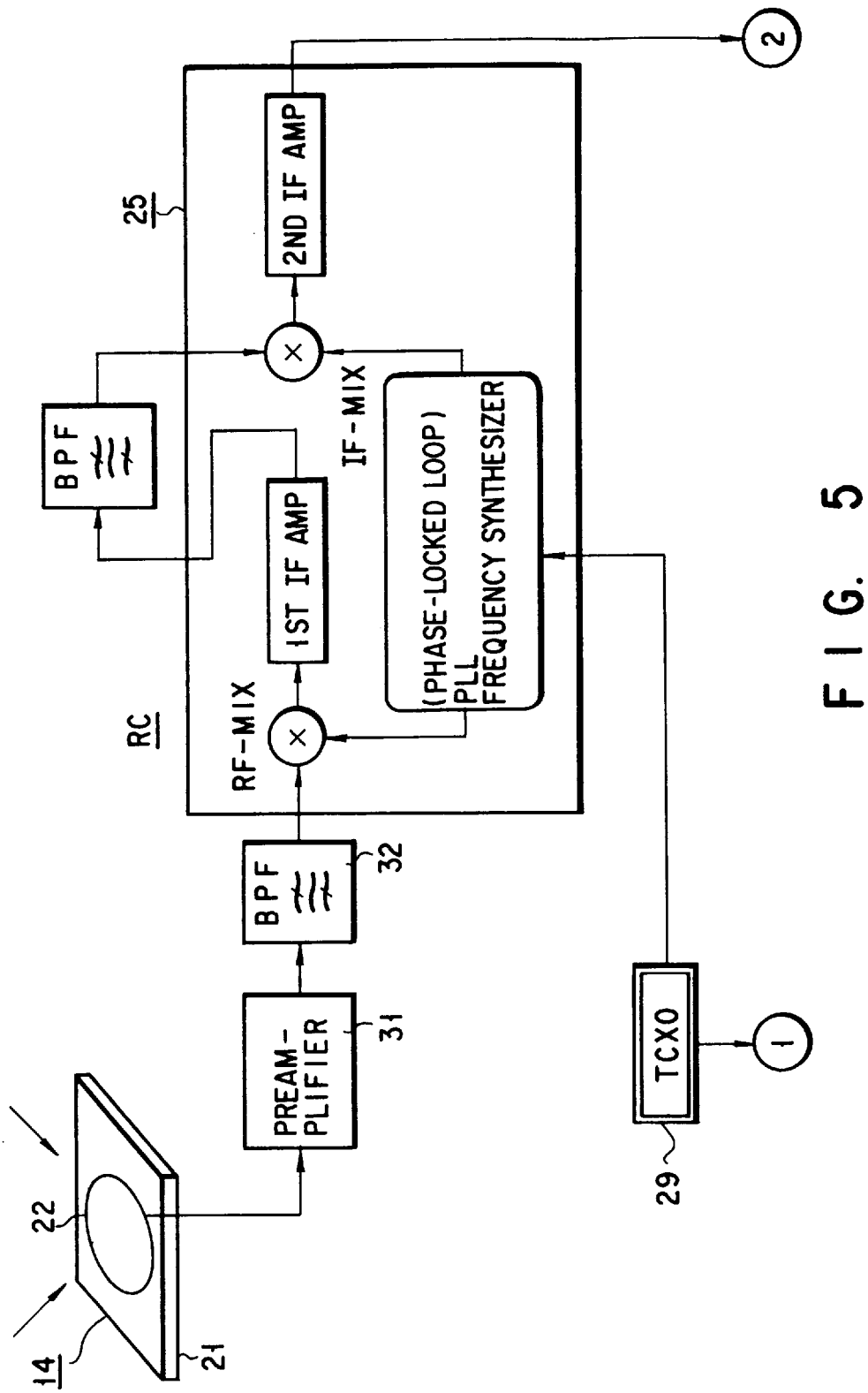
FIG. 5 is a block diagram showing part of the basic circuit of the apparatus of the first embodiment.

FIGS. 5 and 6 are block diagrams, one showing part of the basic circuit of the portable GPS position measuring/displaying apparatus of the first embodiment, and the other showing the remaining part of that basic circuit. As shown in FIG. 5, the information included in the GPS waves (f=1575.42 MHz) received by the GPS antenna 14, i.e., feeble high-frequency signals are amplified by a preamplifier 31 which is formed on the reverse side of the alumina substrate 21 by printing. The amplified signals are supplied to the RF LSI 25 by way of a SAW (surface acoustic wave) filter (BPF) 32. Oscillation outputs of the quartz oscillator 29 are also supplied to the RF LSI 25.

The GPS receiver RC, whose major section is the RF LSI 25, processes the high-frequency signals. Specifically, the GPS receiver RC executes frequency conversion and detects a C/A code (clear and acquisition), so as to produce position data regarding an object to be measured. An oscillation output from the quartz oscillator 29 and position measurement data from the RF LSI 25 are supplied to the code processing LSI 26, as can be seen from FIGS. 5 and 6. (The numerals "1" and "2" enclosed within the circles represent how the circuits shown in FIGS. 5 and 6 are related to each other.)

As shown in FIG. 6, the code processing LSI 26 is of a multi-channel configuration. The code processing LSI 26 usually includes 8 to 12 channels though it is depicted as including only 4 channels, for the sake of simplicity. On the basis of the oscillation outputs supplied from the quartz oscillator 29 and the position data supplied from the RF LSI 25, the code processing LSI 26 acquires and traces data on the C/A code in synchronization, and detects navigation data and pseudo distance data ri represented as follows:

$$ri = C[(t_G - t_S) + \Delta t]$$

where C is a light propagation speed, $t_G$ is a time when a terrestrial GPS receiver receives a wave from a satellite, $t_S$ is a time when the satellite emits the wave, and Δt is an offset of the timepiece of the GPS receiver to the atomic clock of the satellite.

The detected navigation data and pseudo distance data are supplied to a microprocessor 40, which is comprised of 16 or 32 bits and made of the MPU LSI 27 mentioned above. ROM 41 contained in the map storage card 13, the calendar timepiece 42 made of the timepiece LSI 28 and the LSI 24 for enabling data entry from the keyboard and for driving the display, are connected to the microprocessor 40. The liquid crystal display 11 and the operation keys 12 are connected to LSI 24.

The calendar timepiece 42 is a timepiece which operates, with the outputs from the quartz oscillator 29 as clock pulses. The calendar timepiece 42 is required for measuring and calculating an object position from the navigation data superimposed on GPS waves. The time indicated by the timepiece 42 can be adjusted by use of atomic clock information which is included in the GPS wave and transmitted at intervals of one second. The adjusted and accurate time is displayed on the liquid crystal display 11 when necessary.

An operation processing unit AC, whose major section is made of the microprocessor 40, detects the orbit position of each satellite by executing calculation on the basis of the navigation data supplied from the code processing LSI 276 and the pseudo distance data. After calculating the present position of the object to be measured by utilizing the result of calculation, the operation processing unit AC converts the coordinates so that they can be used in the position measurement system of a given region (e.g., Tokyo), and supplies the resultant coordinates to LSI 24 (i.e., the LSI for enabling data entry from the keyboard and for driving the display), along with map data read out from the ROM 41.

Figure 7:
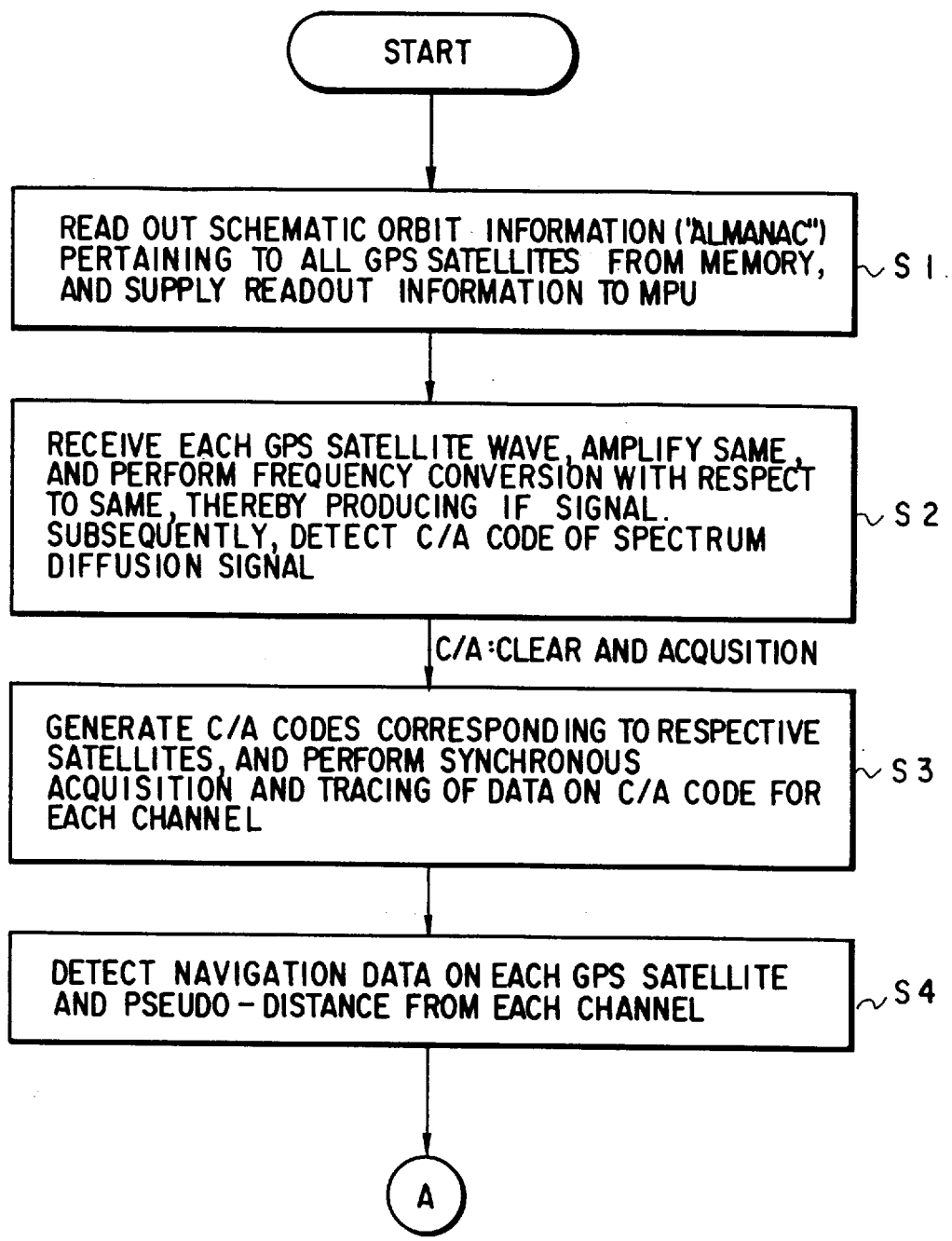
FIG. 7 shows a first flowchart explaining how the apparatus of the embodiment operates.
Figure 8:
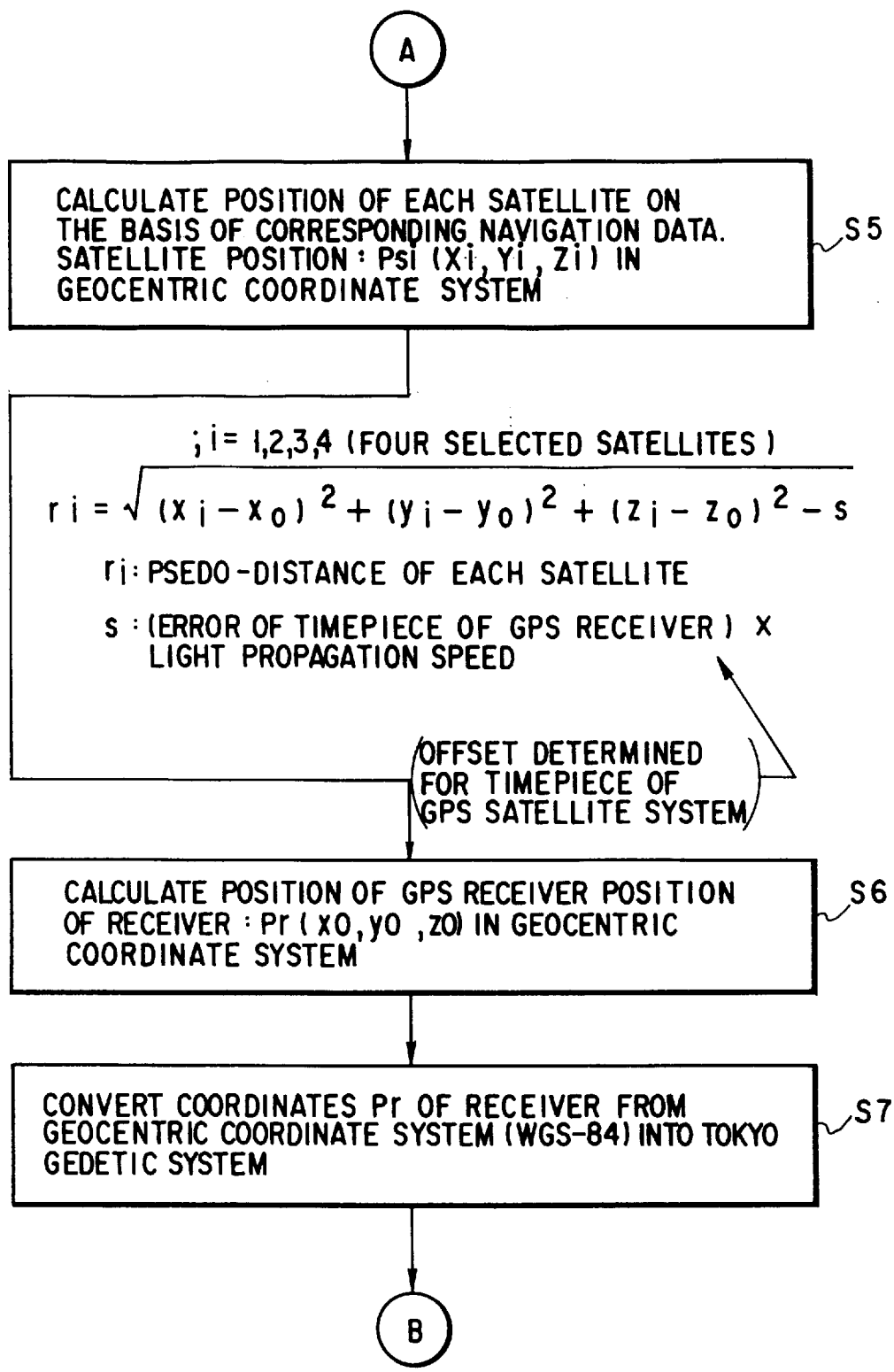
FIG. 8 shows a second flowchart explaining the operation of the apparatus of the embodiment.
Figure 9:
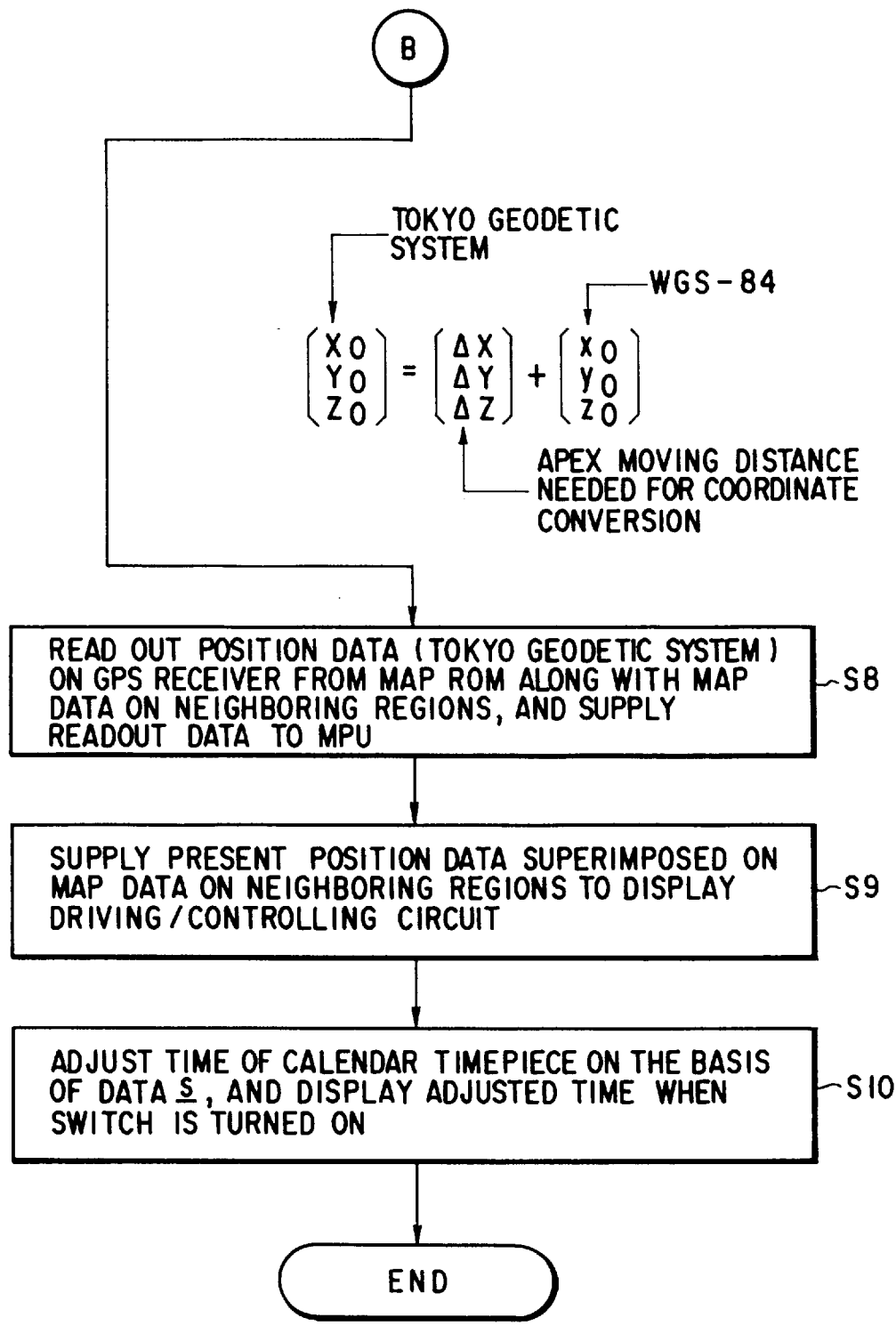
FIG. 9 shows a third flowchart explaining the operation of the apparatus of the embodiment.

A description will be given of the coordinate conversion which is performed for using coordinates in the position measurement system of Tokyo. The navigation data of a GPS satellite is represented in World Geodetic System WGS-84, which is a three-dimensional coordinate system whose origin is the center of the earth. Therefore, the navigation data of the GPS satellite has to be converted into data which complies with the map system of a country. In order to use the subject apparatus in Japan, the navigation data must be converted into data which can be used in Japan Map System (generally referred to as Tokyo Geodetic System). In the following, therefore, a description will be given of the case where the subject apparatus is used in Japan, FIGS. 7 to 9 are flowcharts showing the operation of the apparatus of the first embodiment. The operation of the apparatus will be described, referring to the steps one by one.

(STEP 1) Schematic orbit information, which pertain to all GPS satellites and are generally referred to as "almanac information", are read out from a memory located in the neighborhood of the CPU. The schematic orbit information are transferred to microprocessor 40.

(STEP 2) After being received, each GPS satellite wave is supplied to RF LSI 25, by which it is amplified and frequency-converted into an IF signal. Subsequently, the C/A code of the spectrum diffusion signal is detected.

(STEP 3) Due to the code processing performed by code processing LSI 26, C/A codes corresponding to the respective satellites are generated. Synchronous acquisition and tracing of the data on the C/A code are performed for each of the channels.

(STEP 4) Navigation data on each GPS satellite and a pseudo-distance are detected from each of the channels of the code-processing LSI 26.

(STEP 5) The position of each satellite is calculated on the basis of the corresponding navigation data by use of the three-dimensional rectangular Cartesian coordinate whose origin is the center of the earth.

(STEP 6) The position of a GPS receiver is calculated.

(STEP 7) The coordinates of the GPS receiver are converted from the geocentric coordinate system into Tokyo Geodetic System.

(STEP 8) The positional data (Tokyo Geodetic System) on the GPS receiver is read out from the ROM 41 of the map storage card 13, along with the map data on the neighboring regions, and is then supplied to the microprocessor 40.

(STEP 9) The present position data superimposed on the map data on the neighboring regions is transferred from the microprocessor 40 to LSI 24 (which is for driving the display).

(STEP 10) The time measured by the calendar timepiece 42 is adjusted on the basis of the atomic clock information included in the navigation data on the satellite at appropriate timings. The correct time is displayed on the liquid crystal display 11 in response to the operation of turning on the timepiece switch.

As described above, the portable GPS position measuring/displaying apparatus of the embodiment is made mainly of a single card-type case 10. The small-sized liquid crystal display 11 is provided on the outer wall of the card-type case 10. Alternatively, the liquid crystal display 11 may be provided on the inner side of a notebook-type case (foldable type). The liquid crystal display 11 is arranged on the case 10 along with the operation keys 12 (which are commanders for operating the apparatus). The multi-layered printed circuit board 20, on which the GPS antenna 14, GPS receiver RC (25, 29, 31, 32), the operation processing unit AC (27, 24, 41), etc. are provided, is arranged inside the case 10. A map storage card 13, such as a card which stores map data or a card which stores an object arrangement diagram, is inserted in the card-type case 10.

With this structure, the subject portable GPS object measuring/displaying apparatus is very compact in size and light in weight. It can be easily carried in a pocket of the clothes of the user. When the user wants to know the present position, the user picks up the apparatus from the pocket, and insert the map storage card 13 in the apparatus while holding the apparatus in a horizontal state. By causing the apparatus to execute a position measuring operation (which requires 30 seconds or so), a desired map is displayed on the liquid crystal display 11 on a standard scale (1/50,000) or a reduced scale (1/200,000), and the present position of the user is indicated in a superimposed fashion. (For example, the present position of the user is indicated in color or by blinking. Since the user can easily confirm the present position in this manner, he can think of the best way to arrive at the destination.

The printed GPS antenna 14, the multi-layered printed circuit board including a number of LSIs, the small-sized liquid crystal display 11, and other structural elements of the present invention are readily available and are not expensive. Therefore, the entire apparatus can be manufactured at a low cost, which is at least one half of the cost needed for manufacturing a conventional apparatus.

In the subject apparatus, the time measured by the calendar timepiece 42, which operates by utilizing the outputs of the quartz oscillator 29 as clock pulses, is adjusted on the basis of the atomic clock information included in the GPS wave, and the time, thus adjusted, can be displayed on the liquid crystal display 11. Therefore, the time indicated by the calendar timepiece 42 can be easily adjusted with high accuracy, it is easy to know the accurate standard time (i.e., the world standard time indicated in terms of Japan time).

(Modifications)

The portable GPS position measuring/displaying apparatus of the above embodiment may be modified, as explained below. For example, the apparatus can be combined with a portable telephone. To be more specific, the portable telephone can be housed inside the apparatus. In this case, the telephone can be operated by means of the telephone button shown in FIG. 2.

Figure 10:
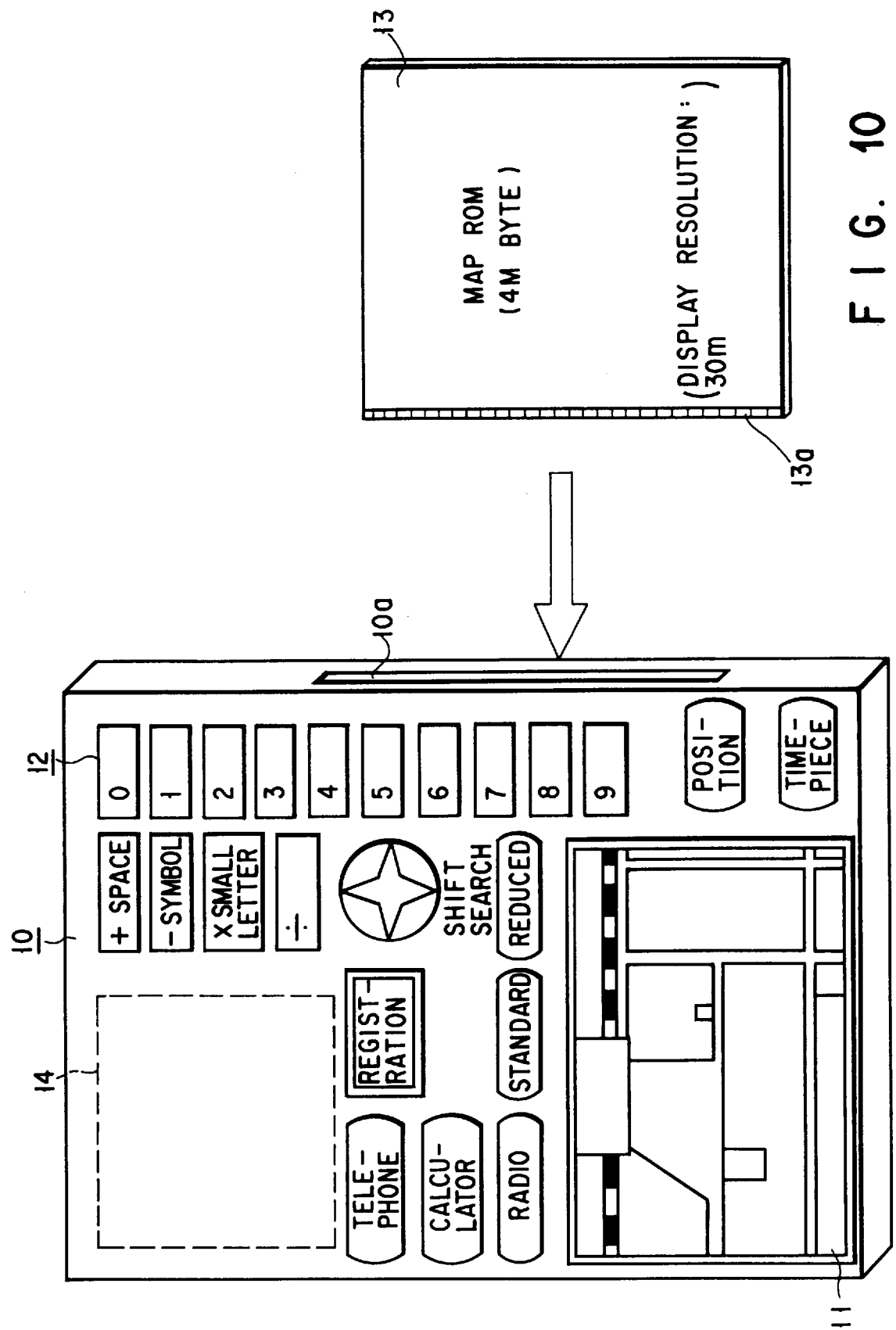
FIG. 10 is a perspective view showing a portable GPS position measuring/displaying apparatus according to the second embodiment of the present invention.

The apparatus shown in FIG. 10 has a radio button. A card-type radio capable of receiving FM multiplex broadcasting is arranged inside the apparatus. In this case, the DGPS function (GPS of the relative position measurement system) can be attained by utilizing the signals received by the FM multiplex broadcasting card, so that position measurement can be performed with very high accuracy (an error: 5 to 10 m). This function is effective in greatly reducing the measurement error (30 to 100 m), since measurement error-correcting information regarding each GPS satellite, which are included in the data received by FM multiplex broadcasting, can be utilized by the GPS receiver.

As shown in FIG. 11, the GPS position measuring/displaying system 200 can be in the form of a notebook. This type of apparatus is easy to carry and use. The notebook-type case 100 is made up of a base member 100A and a cover plate 100B. The base member 100A and the cover plate 100B are coupled together by means of a flexible member 100C such that the cover plate 100B is opened or closed with reference to the base member 100A. A variety of operation keys 112A are provided on the outer wall of the card-type base member 100A, and a map storage card is inserted into the base member 100A. A multi-layered printed circuit board is located within the interior of the base member 100A. The multi-layered printed circuit board includes the following: a patch type GPS antenna 114 for receiving GPS waves from an artificial satellite; a GPS receiver made of an LSI which processes information represented by the GPS waves received by the GPS antenna 114 so as to produce position data of an object to be measured; an operation device made of an LSI which calculates the position where the object to be measured is present on the basis of the position data produced by the GPS receiver; and display means for displaying the position of the object calculated by the operation device on the screen of the liquid crystal display 111 such that the calculated position is superimposed on map data read from the map storage card 13. These structural components are arranged on the printed circuit board with high density. A liquid crystal display 111 and a variety of operation keys 112B are arranged on the inner side of the cover plate 100B. In this notebook-type portable GPS position measuring/displaying apparatus 200, the structural components, including the circuit elements shown in FIGS. 2 to 3, are arranged such that some of them are contained in the base member 100A and the remainder are contained in the cover plate 100B.

As shown in FIG. 11, the portable GPS position measuring/displaying apparatus 300 shown in FIG. 2 can be connected to a notebook-type or desk top personal computer 400. In this case, the portable GPS position measuring/displaying apparatus 300 is provided with a connector 302, and a cable connected to the personal computer is coupled to this connector 302. Outputs from the portable GPS position measuring/displaying apparatus 300 are supplied to the computer 400 by way of the connector 302 and the cable 301, and the graphics indicative of the position of the object to be measured and the measurement data are clearly displayed on an enlarged scale.

As shown in FIG. 13, the subject portable GPS position measuring/displaying apparatus 300 can be detachably installed on a vehicle 500, such as a motorcar or a motorbike, by means of an attachment tool 303.

(Outline of Features of Embodiment)

The structure and advantages of the portable GPS position measuring/displaying apparatus will be outlined.

[1] The portable GPS position measuring/displaying apparatus of the embodiment comprises a single card-type case 10, and a liquid crystal display 11 and a variety of operation keys 12 are provided on the outer wall of the card-type case 10. A map storage card 13 is inserted into the interior of the card-type case 10; it is detachable from the case 10 after use. A multi-layered printed circuit board is housed in the interior of the card-type case 10. The multi-layered printed circuit board includes the following: a patch type GPS antenna 14 for receiving GPS waves from an artificial satellite; a GPS receiver RC (25, 29, 31, 32) made of an LSI which processes information represented by the GPS waves received by the GPS antenna 14 so as to produce position data of an object to be measured; an operation device AC (27, 24, 41) made of an LSI which calculates the position where the object to be measured is present on the basis of the position data produced by the GPS receiver; and display means for displaying the position of the object calculated by the operation device on the screen of the liquid crystal display 111 such that the calculated position is superimposed on map data read from the map storage card 13. These structural components are arranged on the printed circuit board with high density.

The above portable GPS position measuring/displaying apparatus is basically made of a single card-type case 10 which is substantially equal in size to a small notebook (pocket-sized notebook), and the liquid crystal display 11 and the operation keys 12 are arranged on the outer wall of that case 10. The multi-layered printed circuit board arranged inside the apparatus includes a GPS antenna 14, a GPS receiver RC (25, 29, 31, 32), etc. A map storage card 13, such as a card which stores map data or a card which stores an object arrangement diagram, is detachably inserted in the card-type case 10.

With this structure, the subject apparatus is compact and small in size and light in weight, and can be easily carried in a pocket of the clothes of the user when the user goes outside. Since the user can easily confirm the present position, the apparatus can be used for preventing lost children and is very useful in emergency.

In addition, the small-sized liquid crystal display 11, the operation keys 12, the map storage card 13, the printed GPS antenna 14, the multi-layered printed circuit board on which a number of LSIs are installed with high density, and other structural elements of the present invention are small in size and readily available. Therefore, the entire apparatus can be manufactured at a low cost, which is at least one half of the cost needed for manufacturing a conventional apparatus.

[2] The portable GPS position measuring/displaying apparatus of the embodiment comprises: a card-type case 10; a liquid crystal display 11 provided for the card-type case 10; operation keys 12 of a variety of kinds which are provided on the case 10; a map storage card 13 detachably inserted in the portable case and having a read-only memory (ROM) 41 which stores graphic data representing a map or an object arrangement; and a multi-layered printed circuit board inserted in the interior of the card-type case 10. The printed circuit board includes: a GPS antenna 14, made of a metal foil pattern 22, for receiving GPS waves from an artificial satellite; a GPS receiver RC (25, 29, 31, 32) made of an LSI which processes information represented by the received GPS waves so as to produce position data of an object to be measured; an operation device AC (27, 24, 41) for calculating the position where the object to be measured is present on the basis of the position data; and means for displaying the calculated position of the object on the screen of the liquid crystal display 11 such that the calculated position is superimposed on map data read from the ROM 41 of the map storage card 13. These structural elements are arranged with high density. With this structure, the portable GPS position measuring/displaying apparatus produces advantages which are similar to those described in item [1] above. In addition, since the structural elements which produce the advantages are specifically recited, the apparatus of item [2] can be easily reduced to practice.

[3] The portable GPS position measuring/displaying apparatus of the embodiment has the structure recited in either item [1] or [2], and further comprises time-adjusting means. By this time-adjusting means, the time measured by the calendar timepiece 42, which operates by utilizing the outputs of the quartz oscillator 29 of the operation device AC (27, 24, 41) as clock pulses, is adjusted on the basis of the atomic clock information included in the GPS wave received by the GPS antenna 14. The time, thus adjusted, is displayed on the liquid crystal display 11.

In this portable GPS position measuring/displaying apparatus, the time measured by incorporated timepiece 42 is adjusted at an arbitrary time on the basis of the atomic clock information included in the GPS wave, and the adjusted time is displayed, if required. This apparatus is advantageous in that the time measured by the timepiece 42 can be adjusted with high accuracy, and that the user is allowed to know the accurate standard time (world standard time) at any time.

According to the present invention, it is possible to provide a portable GPS position measuring/displaying apparatus which is advantageous in the following points:

(a) The subject device is made mainly of a single card-type case which is substantially equal in size to a small notebook (pocket-sized notebook). Major structural components are integrally provided for this case, and a map storage card is detachably inserted into the interior of the case. Since the subject apparatus is very compact in size and light in weight, it can be easily carried in a pocket of the clothes of the user. The user can easily know the present position whenever necessary, and the apparatus is effective in preventing lost children and is very useful in emergency.

(b) The liquid crystal display, the operation keys, the map storage card, the printed GPS antenna, the multi-layered printed circuit board on which a number of LSIs are assembled with high density, and other structural elements of the present invention are small in size and are not expensive. Therefore, the entire apparatus can be manufactured at a low cost, which is at least one half of the cost needed for manufacturing a conventional apparatus.

(c) In the portable GPS position measuring/displaying apparatus, the time measured by the incorporated timepiece can be accurately adjusted on the basis of atomic clock information included in the GPS waves. The adjusted time can be displayed, if required. In this manner, the time of the timepiece, which is required for measuring the present position on the basis of the navigation data, can be accurately adjusted. In addition, it is possible to confirm the accurate standard time (world standard time).

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A portable GPS position measuring/displaying apparatus comprising:

a portable case;

a liquid crystal display provided for the portable case;

operation keys provided on the case;

a map storage card detachably inserted in the portable case; and a multi-layered printed circuit board inserted in the portable case, said printed circuit board including: a patch type GPS antenna for receiving GPS waves from an artificial satellite; a GPS receiver made of an LSI which processes information represented by the received GPS waves so as to produce position data of an object to be measured; an operation device for calculating the position where the object to be measured is present on the basis of the position data; and display means for displaying the calculated position of the object on the screen of the liquid crystal display such that the calculated position is superimposed on map data read from the map storage card; and wherein said portable case is a card-type case, and said multi-layered printed circuit board includes a plurality of printed circuit board elements arranged at different levels, said printed circuit board elements having wiring layers which are connected together by use of inner via holes formed in a substrate.

2. A portable GPS position measuring/displaying apparatus according to claim 1, further comprising a connector into which the map storage card is inserted.

3. A portable GPS position measuring/displaying apparatus according to claim 1, further comprising an electronic calculator which is formed integrally with the portable GPS position measuring/displaying apparatus.

4. A portable GPS position measuring/displaying apparatus according to claim 1, further comprising a telephone which is formed integrally with the portable GPS position measuring/displaying apparatus.

5. A portable GPS position measuring/displaying apparatus according to claim 1, further comprising a radio which is formed integrally with the portable GPS position measuring/displaying apparatus.

6. A portable GPS position measuring/displaying apparatus according to claim 1, wherein said portable case serves as an electronic notebook.

7. A portable GPS position measuring/displaying apparatus according to claim 1, wherein the liquid crystal display and the operation keys are provided on one side of the card-type case.

8. A portable GPS position measuring/displaying apparatus according to claim 6, wherein said electronic notebook includes a cover, and the liquid crystal display and the operation keys are provided on an inner side of the cover of the electronic notebook.

9. A portable GPS position measuring/displaying apparatus according to claim 1, further comprising connection means for permitting the apparatus to be connected to a personal computer.

10. A portable GPS position measuring/displaying apparatus according to claim 1, further comprising an attachment tool for permitting the apparatus to be removably attached to a vehicle.

* * * * *